United States Patent [19]

Bowman et al.

[11] 4,193,417
[45] Mar. 18, 1980

[54] FLUID CHECK VALVE DEVICE

[76] Inventors: George F. Bowman, Apartado Postal 4141, San Jose, Costa Rica; Kenneth A. Prescher, 834 E. River Dr., Tampa, Fla. 33617

[21] Appl. No.: 903,067

[22] Filed: May 5, 1978

[51] Int. Cl.² ............................................. F04F 1/06
[52] U.S. Cl. .................................. 137/192; 137/206; 137/433; 137/423
[58] Field of Search ............... 137/192, 211, 211.5, 137/209, 206, 399, 433, 423

[56] References Cited

U.S. PATENT DOCUMENTS

| 2,685,298 | 8/1954 | Clearman | 137/211 |
| 2,972,412 | 2/1961 | Lundeen | 137/192 X |
| 4,051,030 | 9/1977 | Huiet | 137/399 X |

Primary Examiner—Alan Cohan
Attorney, Agent, or Firm—Arthur W. Fisher, III

[57] ABSTRACT

A fluid check valve device for use with a gas precharged fluid storage tank comprising a valve body including a float chamber having an upper and lower check valve assembly formed at opposite ends thereof wherein the lower check valve assembly comprises a lower float member movable between a sealed and unsealed position and a lower valve seat and the upper check valve assembly comprises an upper float member movable between a sealed and unsealed position with a first and second upper valve seat together with antivortex flow apertures formed in the lower portion of the lower float chamber immediately above the lower valve seat and a plurality of float control apertures formed on the mid-portion of the float chamber such that as the gas precharged fluid storage tank is filled with fluid the lower float member is unseated from the lower valve seat permitting the gas precharged fluid storage tank and lower float chamber to be filled through the antivortex flow apertures and wherein the upper float member is moved from the first valve seat as the fluid approaches the top of the valve body to exhaust the gas from the fluid check valve device and seats with the second upper valve seat when the fluid reaches the top of the valve body and wherein as fluid is drawn from the gas precharged fluid storage tank through the antivortex flow apertures and the fluid level within the gas precharged fluid storage tank reaches the level of the upper check valve assembly the upper float member is again sealed with the first upper valve seat to prevent air from entering into the fluid check valve device and as the water level within the precharged fluid storage tank reaches the float control apertures air flows into the float chamber causing the lower float member to move downward until seated or sealed on the lower valve seat to prevent the precharged gas from escaping.

5 Claims, 6 Drawing Figures

U.S. Patent      Mar. 18, 1980      4,193,417
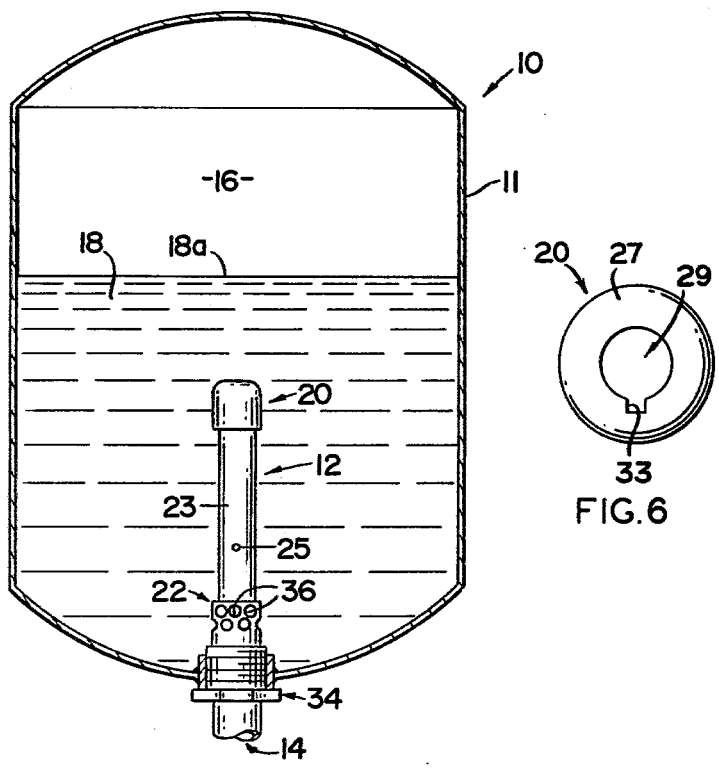
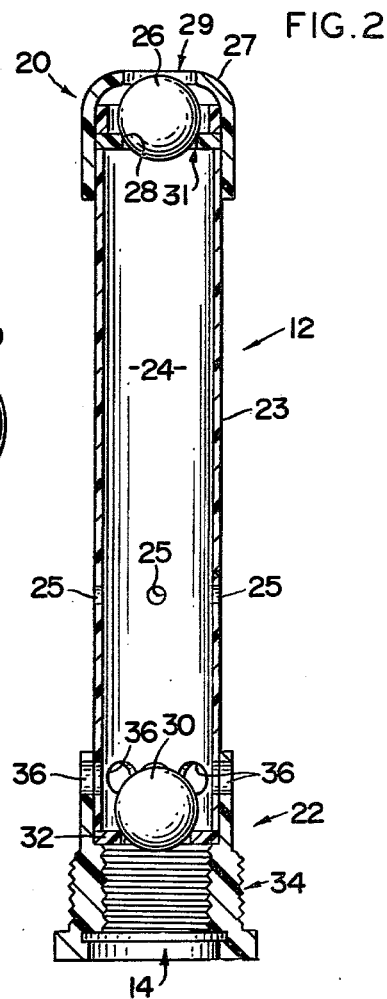
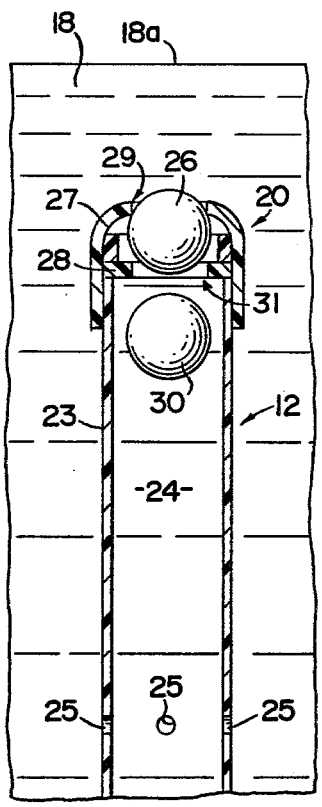
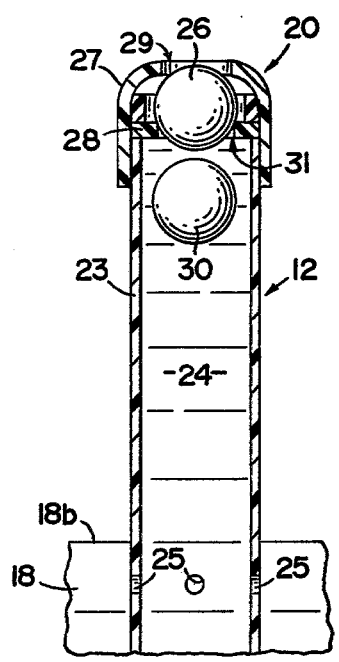
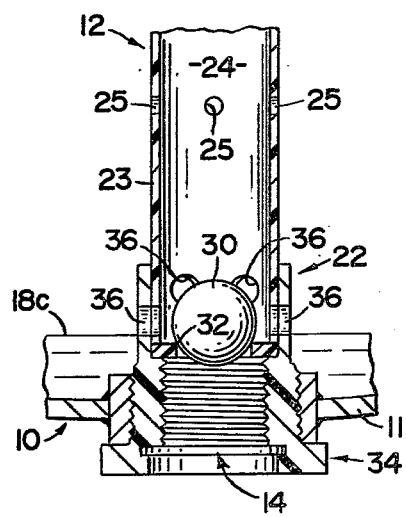

FLUID CHECK VALVE DEVICE

BACKGROUND OF THE INVENTION

1. Field of the Invention

A fluid check valve device for use with a gas precharged fluid storage tank.

2. Description of the Prior Art

A number of devices are provided for precharged storage tanks with air retaining means used in domestic water supply systems and the like.

Generally conventional domestic water supply systems include a pump in combination with a water storage tank for receiving the pump output. Such tanks include means for providing pressure whereby water may be drawn through the domestic piping system when the pump is not operating. Such pressure is created within the tank by trapped gas.

Such water supply systems require periodical replacement of air in the supply tank because the water circulating through the tank will absorb the air through turbulence or vortex to such an extent that the tank eventually becomes completely filled with water. As a result there is no residual air (gas) pressure within the tank. When this condition prevails, the pump starts whenever water is drawn from the tank. This results in excessive power consumption and generally unsatisfactory operation of the water supply system. Moreover on a power failure, over-demand or improper pressure switch setting, the extra air charge may force all of the water from the tank and with the air following.

To reduce these problems, diaphrams, bags, or valves are provided. Unfortunately, a diaphram or bag may rupture, leaving only a standard tank. In this event the diaphram or bag must be replaced to restore the tank to its original capacity.

The following patents exhibit one or more of these structures and attendant problems: U.S. Pat. Nos. 774,972; 849,152; 1,586,079; 2,048,674; 2,714,722; 2,714,723; 3,324,481; 3,553,741; 3,905,050; 3,981,029; and 3,301,275.

SUMMARY OF THE INVENTION

The present invention relates to a fluid check valve device for use with a gas precharged fluid storage tank. More specifically, the fluid check valve device comprises a hollow valve body forming a float chamber and an upper and lower check valve assembly disposed at opposite ends thereof.

The lower check valve assembly comprises a lower valve seat and a lower float member disposed to move between a sealed and unsealed position relative to the lower valve seat. The upper check valve assembly comprises a first and second upper valve seat and upper float member disposed to move between a sealed and unsealed position.

The hollow valve body includes a plurality of antivortex flow apertures formed on the lower portion thereof and a plurality of float control apertures formed on the intermediate portion thereof.

In operation, water enters the gas precharged fluid storage tank through the lower valve seat causing the lower float member to rise in the float chamber. The water then enters the precharged fluid storage tank through the antivortex apertures. The water level gradually rises within the gas precharged fluid storage tank and fluid check valve device. The water level rising within the fluid check valve device lifts the upper float member from the second upper valve seat purging the air (gas) from the fluid check valve device. The overall length of the valve body is such that water level at pump shutoff will be at or above the second upper valve seat assuring complete purging of air (gas) within the float chamber. Air (gas) not purged from the fluid check valve device would expand during draw out and allow the water level within the fluid check valve device to fall prematurely causing the lower float member to descend prematurely.

As water is drawn from the precharged fluid storage tank the water level falls below the upper float member causing it to seal on second upper valve seat. As the water level continues to fall, the water in fluid check valve device is trapped preventing the lower float member from dropping twoard the lower valve seat.

When main water level reaches the float control apertures air (gas) flows into the float chamber allowing the water level within the float chamber to fall to main tank water level.

As the main tank water level falls further, the air in the precharged storage tank moves more freely through the float control apertures than the water through antivortex apertures causing the level in float chamber to drop more rapidly. As a result, the lower float member is seated firmly on lower valve seat as the main tank water level approaches the antivortex apertures.

In normal operation, the pump pressure switch is adjusted to actuate the pump before the minimum water level reaches float control apertures.

Normally when water level drops to float control apertures and pressure switch is at correct setting, the pressure switch will actuate the pump and the precharged fluid storage tank will refill. Thus under proper operation lower float member will always remain floating in the upper portion of the float chamber.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a side view of the fluid check valve device in a precharged fluid storage tank.

FIG. 2 is a detailed cross-sectional side view of the fluid check valve device.

FIG. 3 is a detailed cross-sectional side view of the upper portion of the fluid check valve device.

FIG. 4 is a detailed cross-sectional side view of the upper portion of the fluid check valve device.

FIG. 5 is a detailed cross-sectional side view of the lower portion of the fluid check valve device.

FIG. 6 is a partial top view of the first upper valve seat.

Similar reference characters refer to similar parts throughout the several views of the drawings.

DETAILED DESCRIPTION OF THE PREFERRED EMBODIMENT

As best shown in FIG. 1, the present invention relates to fluid check valve device for use with a gas precharged fluid storage tank generally indicated as 10.

The precharged fluid storage tank 10, including a wall 11, operatively houses the fluid check valve device generally indicated as 12. The fluid check device 12 including a hollow substantially cylindrical valve body is coupled to the precharged fluid storage tank 10 by a mounting means having supply port 14 formed therein. As shown, the precharged fluid storage tank 10 has the capacity to retain a precharged gas within an air chamber 16 and fluid 18 such as water with a water level is indicated as 18a.

As best shown in FIG. 2, the fluid check valve device 12 comprises an upper and lower check valve assembly generally indicated as 20 and 22 respectively. The hollow cylindrical valve body comprises a side wall 23 forming a float chamber 24. As more fully described hereinafter, a plurality of float control apertures 25 are formed in the mid or intermediate portion of the side wall 23. The upper valve assembly 20 comprises an upper float member 26 movable between a sealed and unsealed position together with a first and second upper valve seat 27 and 28 respectively including an upper and lower aperture 29 and 31 respectively as best shown in FIGS. 2 through 4. As shown in FIG. 6, the upper aperture 29 may include a slot 33 or other irregular shape to form a bleed hole to prevent the upper float member 26 from sealing when in the upper position to allow air to be exhausted from the fluid check device 12 during filling. The lower check valve assembly comprises a lower float member 30 movable between a first or sealed and a second or unsealed position together with a lower valve seat 32 having an aperture formed therein.

As described more fully hereinafter with reference to both the structure and operation thereof, the fluid check device 12 is specifically designed to provide a means in precharged fluid storage tanks to prevent the loss of air by absorption through excessive turbulence during the filling process as well as to prevent loss of air during dispensing process due to the vortex effect.

In addition, the structure maximizes water volume output without the loss of any air charge, by preventing premature closing of the fluid check device 12 during dispensing of the water from the precharged fluid storage tank 10.

The fluid check device 12 is mounted within the precharged fluid storage tank 10 by the mounting means 34 including supply port 14 previously referred to. As best shown in FIGS. 1 and 2, a plurality of antivortex flow apertures 36 are formed in lower portion of the side wall 23 and in the upper portion of the mounting means 34. These antivortex flow apertures 36 are substantially perpendicular to the supply port 14 and parallel to the surface of the water 18a to reduce fluid turbulence during filling or dispensing of the fluid.

In operation, water enters the precharged fluid storage tank 10, through supply port 14 and valve seat 32 causing the lower float member 30 to rise in the float chamber 24. The water then enters the precharged fluid storage tank 10 through antivortex apertures 36 which are angularly disposed to the direction of the water flow through the supply port 14. The water level 18a gradually rises within the precharged fluid storage fluid check valve 12. The relative position of the antivortex apertures 36 and location of the fluid check device 12 in the center of the precharged fluid storage tank 10 also minimizes turbulence during filling. The water level 18a rising within the fluid check valve 12 lifts the upper float member 26 from the first upper valve seat 28 purging the air from the fluid check device 12. The overall length of the valve body 12 is such that water level 18a at pump shut off will be at or above the second upper valve seat 28 assuring complete purging of air with the float chamber 24. Air not purged from the fluid check valve 12 would expand during draw out and allow the water level within the fluid check valve 12 to fall prematurely causing the lower float member 30 to descend prematurely.

As water is drawn from the precharged fluid storage tank 10, the water level 18a falls below the upper float member 26 causing it to seal on second upper valve seat 28. As the water level 18a continues to fall, the water in fluid check valve 12 is trapped preventing the lower float member 30 from dropping toward lower valve seat 32.

When main water level 18a reaches the float control apertures 25, air rapidly flows into the float chamber 24 allowing the water level within the lower chamber 24 to fall to main tank water level 18a.

As the main water level 18a falls further approaching the antivortex apertures 36, the air in the precharged storage tank 10 moves more freely through the float control aperture 25 than the water through antivortex apertures 36 causing the level in float chamber 24 to drop rapidly causing the lower float member 30 to seal firmly on lower valve seat 32.

In normal operation, the pump pressure switch (not shown) is adjusted to actuate the pump (not shown) before the minimum water level 18a reaches float control apertures 25.

Normally when water level 18a drops to float control apertures 25 and pressure switch is at correct setting (for example, 2 pounds higher than air charge), the pressure switch will actuate the pump and the precharged fluid storage tank 10 will refill. Thus under proper operation lower float member 32 will always remain floating in the upper portion of float chamber 24.

In the event of power failure, over-demand or improper pressure switch setting, should water level 18a ever reach float control apertures 25 air pressure in the tank 10 will force air into the float control apertures 25 and force lower float member 30 onto the lower valve seat 32 and thus prevent further air or water loss.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A fluid check valve device for use with a gas precharged fluid storage tank; said fluid check valve device comprising a hollow valve body operatively mounted within the precharged fluid storage tank, said hollow valve body having a float chamber formed therein and a lower check valve assembly disposed at the lower end thereof, said hollow valve body having at least one antivortex aperture formed on the lower portion thereof above said lower check valve assembly, said lower check valve assembly comprising a lower valve seat and lower float member disposed to move between a sealed and unsealed position relative to said lower valve seat, said lower float member moving from said unsealed position to said sealed position when the fluid level within the gas precharged fluid storage tank approaches said antivortex aperture, said hollow valve body further includes at least one float control aperture formed on the intermediate portion thereof in spaced relation relative to said antivortex aperture to control the rate of vertical movement of said lower float member in response to the fluid level within the gas precharged fluid storage tank such that as fluid is drawn from the precharged fluid storage tank said lower float member remains in the uppermost portion of said hollow valve body until the fluid level reaches said float control aperture causing said lower float member to rapidly accelerate downward to said sealed position.

2. The fluid check valve device of claim 1 further including an upper check valve assembly comprising a first and second valve seat and an upper float member movable between a sealed and unsealed position, said upper float member moving from said unsealed to said sealed position when the fluid level within the precharged fluid storage tank descends to said second upper valve seat.

3. The fluid check valve device of claim 2 wherein said first upper valve seat forms an irregular shape to prevent said upper float member from sealing therewith to permit exhausting of gas from said hollow valve body as the water level approaches said upper check valve assembly during filling.

4. The fluid check valve device of claim 1 further comprising a mounting means to couple said fluid check valve device to the gas precharged fluid storage tank, said mounting means including a supply aperture in communication with said antivortex aperture.

5. The fluid check valve device of claim 1 wherein said hollow valve body is disposed at substantially the center of the gas precharged fluid storage tank to prevent fluid vortex.

* * * * *